United States Patent [19]
Kawaguchi et al.

[11] 4,156,532
[45] May 29, 1979

[54] SEALING DEVICE FOR AN AUTOMOBILE DISK BRAKE

[75] Inventors: Hiroshi Kawaguchi; Koji Nishikawa, both of Susono, Japan

[73] Assignee: Toyota Jidosha Kogyo Kabushiki Kaisha, Aichi, Japan

[21] Appl. No.: 754,671

[22] Filed: Dec. 27, 1976

[30] Foreign Application Priority Data

Dec. 28, 1975 [JP] Japan .................. 50-179452[U]

[51] Int. Cl.² ........................................ F16J 9/20
[52] U.S. Cl. ............................ 277/165; 277/170; 277/212 FB; 188/71.8; 251/DIG. 1; 285/DIG. 19
[58] Field of Search ............. 277/168–172, 277/165, 177, 212 FB, 188 A; 285/DIG. 19; 251/DIG. 1; 188/71.8, 71.4, 196 P

[56] References Cited

U.S. PATENT DOCUMENTS

| | | | |
|---|---|---|---|
| 2,180,795 | 11/1939 | Christensen | 285/DIG. 19 |
| 3,186,521 | 6/1965 | Chouings | 188/71.8 X |
| 3,285,370 | 11/1966 | Swift | 188/71.8 |
| 3,377,076 | 4/1968 | Burnett | 277/171 |
| 3,724,605 | 4/1973 | Naismith et al. | 188/71.8 |
| 3,915,461 | 10/1975 | Gautier | 277/171 X |

FOREIGN PATENT DOCUMENTS

| | | | |
|---|---|---|---|
| 568017 | 6/1958 | Belgium | 277/170 |
| 904906 | 7/1972 | Canada | 188/196 P |
| 1375465 | 9/1964 | France | 277/172 |
| 1041729 | 10/1958 | Fed. Rep. of Germany | 277/170 |
| 2326047 | 12/1973 | Fed. Rep. of Germany | 188/196 P |
| 2320291 | 4/1974 | Fed. Rep. of Germany | 188/71.4 |
| 474055 | 10/1937 | United Kingdom | 277/172 |
| 726809 | 3/1955 | United Kingdom | 277/170 |
| 1058660 | 2/1967 | United Kingdom | 277/168 |
| 1043331 | 9/1966 | United Kingdom | 188/196 P |

*Primary Examiner*—Robert S. Ward, Jr.
*Attorney, Agent, or Firm*—Stevens, Davis, Miller & Mosher

[57] ABSTRACT

A sealing device to be applied between a piston and a cylinder of a disk brake on an automobile. The sealing device comprises an annular seal groove provided in the inner surface of the cylinder and a seal ring inserted in the seal groove, the seal groove having a beveled wall between its front and bottom walls, the seal ring having a beveled surface provided between its front and outer surfaces and engageable with the beveled wall of the seal groove, the seal ring being compressed into the seal groove by the piston with a space between the front surface of the seal ring and the front wall of the seal groove. When the piston of the disk brake is activated hydraulically, the seal ring is elastically deformed with the movement of the piston to build up elastic energy. When the piston is set free from the hydraulic pressure, the piston returns easily to its original position by means of the elastic energy built up in the seal ring.

6 Claims, 6 Drawing Figures

SEALING DEVICE FOR AN AUTOMOBILE DISK BRAKE

BACKGROUND OF THE INVENTION

This invention relates to a sealing device to be applied between a piston and a cylinder in a disk brake on an automobile.

In an automobile disk brake, sealing between a cylinder and a hydraulically movable piston in the cylinder is ordinarily obtained by a seal ring having a rectangular cross section and fitted in a circular groove provided in the inner surface of the cylinder and having a substantially rectangular cross section. The seal ring is radially compressed against the groove by the outer surface of the piston. the front wall of the seal groove or its wall closer to the friction pads is beveled at its open end. When the piston moves hydraulically, that portion of the seal ring which is frictionally engaged with the piston moves along with the piston and is deformed and brought into contact with the beveled portion of the sealing groove to build up elastic energy. When the piston is set free from the fluid pressure, the elastic energy built up in the seal ring brings back the piston to its original position.

When fluid pressure is applied onto the piston to actuate the disk brake, however, the seal ring is deformable only to the extent which is allowed by the limited clearance space defined by the beveled portion of the seal groove. When the fluid pressure is increased, no further deformation of the seal ring can take place, but the piston starts to slide on the seal ring without accompanying any further movement of the latter. Therefore, when the fluid pressure is reduced, the piston fails to go back to its original position, but stops in a position displaced therefrom toward the friction pads by the distance of its sliding movement relative to the seal ring. Such displacement causes incomplete separation of the pads from the wheel disk and the lateral movement of the pads due to their contact with the wheel disk. The pads become worn too quickly and the wheel disk is undesirably heated with a resultant reduction in the brake performance. The contact of the pads with the wheel disk increases resistance to wheel rotation, and the fuel consumption of the automobile.

In order to allow a greater degree of elastic deformation of the seal ring, it has been proposed, for example, to enlarge the width of the beveled portion without changing its angle relative to the front wall of the groove, or increase the angle of inclination of the beveled portion. In case the former step is adopted, however, the front wall of the seal groove becomes too small in width to maintain the sealing groove deep enough to hold the seal ring in position. The latter method, though it does not involve the defect of the former method, requires the seal ring to be made of very easily deformable material; otherwise, the piston will slide along the seal ring before the seal ring is fully deformed to contact the beveled portion. Such sliding movement of the piston can only be prevented by applying a greater compressive force onto the seal ring; in other words, the seal ring needs to be formed with an increased wall thickness. In this case, the seal ring is liable to be chipped upon sliding movement of the piston and the resistance exerted by the seal ring on the piston prevents smooth application of the brakes.

SUMMARY OF THE INVENTION

An object of this invention is to provide a sealing device for a piston of a disk brake, which ensures return of the piston to its original position in relation to a cylinder, when the piston is set free from pressure.

Another object of this invention is to provide a sealing device for a disk brake which prevents sliding movement of the piston in relation to a seal ring.

A further object of this invention is to provide an improved configuration of a seal groove having a cross section so designed as to ensure return of the piston to its original position, when the piston is set free from pressure in a disk brake.

A still further object of this invention is to provide an improved configuration of a seal ring having a cross section so designed as to ensure return of the piston to its original position, when the piston is set free from pressure in a disk brake.

DETAILED DESCRIPTION OF THE INVENTION

Figure 1:
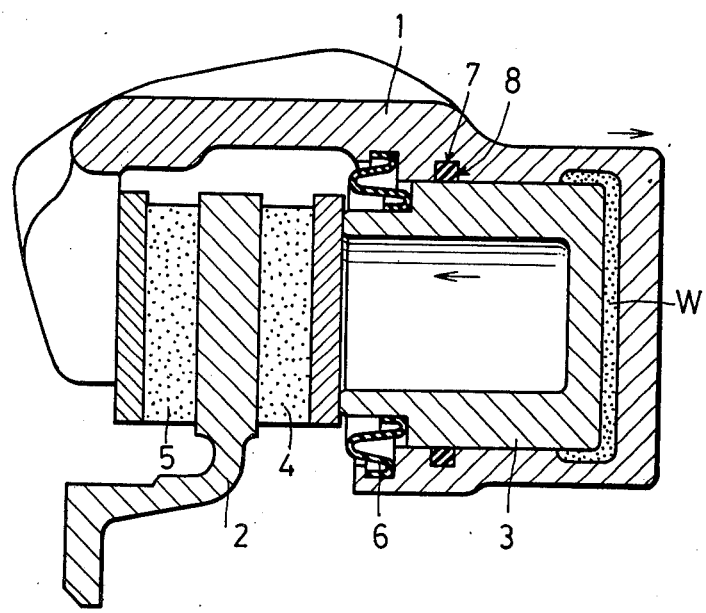
FIG. 1 is a longitudinal sectional view of a cylinder for a disk brake in which a sealing device of this invention is applied.
Figure 2:
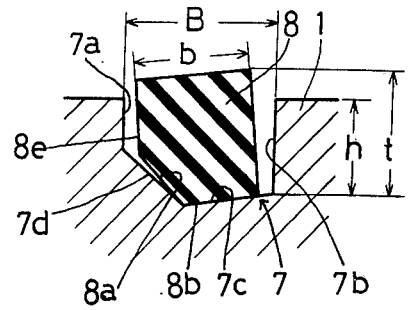
FIG. 2 is an enlarged cross sectional view of an embodiment of a seal groove in which a seal ring is inserted.

Referring to FIG. 1, a disk brake has a cylinder 1 extending over a disk 2 of an automobile wheel. A piston 3 is inserted in the cylinder 1, slidably along the inner surface of the cylinder 1. A pad 4 is mounted on the front edge (left edge in the drawing) of the piston 3 in opposition to one surface of the disk 2. There is provided another pad 5 opposite to the other surface of the disk 2 in the cylinder 1. The pads 4 and 5 are adapted to press themselves against the opposite surfaces of the disk 2 when the piston 3 is moved toward the disk 2 by working fluid W introduced under pressure into the cylinder 1. A boot 6 is provided between the front end portion of the piston 3 and the cylinder 1 in order to permit relative movement thereof without breaking the seal between the sliding surfaces thereof.

There is provided in the inner surface of the cylinder 1 an annular seal groove 7 defined by a front wall 7a, a rear wall 7b, a V-shaped bottom wall having legs 7c and 7d extending between the front wall 7a and the rear wall 7b. The bottom wall legs 7c is slightly slanting and the groove 7 is deepest at the junction between the bottom wall legs 7c and 7d.

Figure 3:
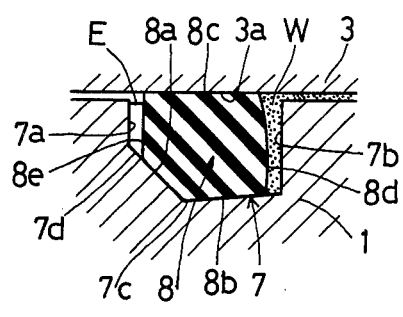
FIGS. 3 and 4 are enlarged cross sectional views illustrating the elastic deformation of the seal ring.

A seal ring 8 of resilient material is inserted in the seal groove 7, and has a radial thickness t larger than the height h of the rear wall 7b of the groove 7 but a smaller breadth b than the breadth B of the groove 7. The seal ring 8 has an a V-shaped outer surface 8b, having legs 8a and an inner surface 8c, a rear surface 8d, and a front surface 8e. The V-shaped outer surface of the seal ring is generally complementary to the V-shaped bottom wall having legs 7c and 7d of the seal groove 7. In FIG. 3, the seal ring 8 is compressed into the seal groove 7 with a predetermined force by the outer surface 3a of the piston 3, leaving a predetermined width of space E between the front wall 7a of the seal groove 7 and the front surface 8e of the ring 8. The leg 8a, the legs 8b and the inner surface 8c are pressed against the leg 7d, the leg 7c and the outer surface 3a of the piston 3, respectively, to shut off any fluidal communication between the opposite sides of the ring 8.

Figure 4:
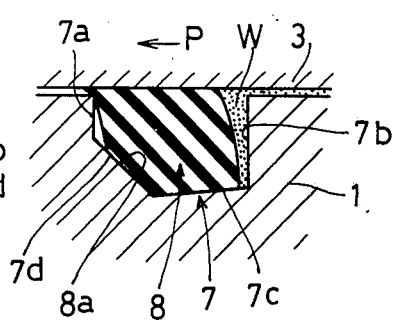

In the aforementioned sealing device according to this invention, the working fluid W flowing into the cylinder 1 is introduced through the cylindrical clearance between the cylinder 1 and the piston 3 into the space between the rear wall 7b of the seal groove 7 and the rear surface 8d of the seal ring 8. FIG. 3 shows the sealing device under no pressure. When the disk brake is to be operated, a predetermined amount of pressure is transmitted from a master cylinder (not shown in the drawings) to the working fluid W in the cylinder 1 in a well known manner. Then, the piston 3 is moved in the direction of an arrow P in FIG. 4 to cause the pads 4 and 5 to press themselves against the disk 2 for braking the wheel. The seal ring 8 moves along with the movement of the piston 3 in the vicinity of the inner surface 8c contacting the piston 3, but remains steady at the leg 8b and the leg 8a which are constricted by the bottom wall 7c legs and 7d of the seal groove 7, respectively. Thus, the seal ring 8 undergoes elastic deformation in the space E defined between the front wall 7a of the seal groove 7 and the front surface 8e of the seal ring 8 during the movement of the piston 3.

When the working fluid W is set free from the pressure in order to release a brake against the disk 2, the piston 3 returns to its original position as shown in FIG. 3 by means of recovering resilience imparted to the seal ring 8. When the deformation of the seal ring 8 responsive to the movement of the piston 3 is fully allowed in the space E, the piston 3 does not move in relation to the seal ring 8, but is permitted to return to its original position in relation to the cylinder 1. When the deformation of the seal ring 8 responsive to the movement of the piston 3 is over the maximum capacity allowed in the space E, the piston 3 moves in relation to the seal ring 8 so far as to correspond to the extra amount of the deformation of the seal ring 8.

Figure 5:
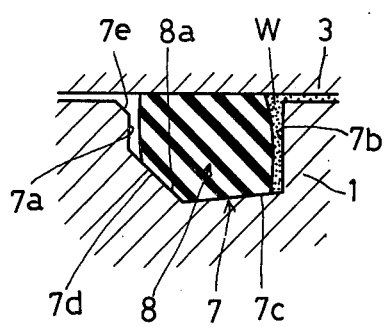
FIGS. 5 and 6 are enlarged cross sectional views, similar to FIG. 2, of a different embodiment of the invention.

The seal ring 8 hereinbefore described according to this invention can be deformed so much as to correspond to the movement of the piston 3 in relation to the cylinder 1, having so much resilience as to permit complete recovery of the piston 3 to its original position. FIG. 5 shows another form of the seal groove 7 which is provided at the outer edge of the front wall 7a with another beveled portion 7e which serves to enlarge the aforementioned space E and, accordingly, permit a greater degree of deformation of the seal ring 8.

Figure 6:
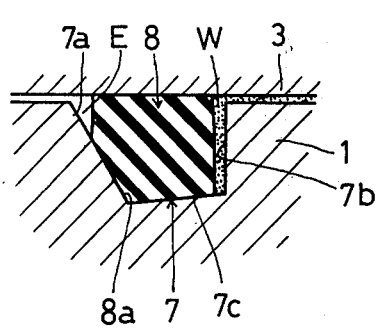

Although in the embodiment as described in FIG. 3 or 5 the leg 7d is provided between the front wall 7a and the leg 7c of the bottom, the front wall 7a itself may be so beveled over its full width in respect to the bottom wall 7c as shown in FIG. 6, as to define a space E between the beveled front wall 7d of the groove 7 and the front surface 8e of the seal ring 8, wherein the deformation of the seal ring 8 is permitted with the same satisfactory results as obtained in the embodiment as described before.

What is claimed is:

1. In a sealing device for an automobile disk brake having a cylinder and a piston slidably inserted in the cylinder, said sealing device comprising an annular seal groove provided in the inner surface of said cylinder and having a substantially rectangular cross section defined by a front wall, a rear wall and a bottom wall, and an elastically deformable seal ring having a substantially rectangular cross section defined by a front surface, a rear surface, an inner surface and an outer surface, the seal ring having a radial thickness larger than the depth of the seal groove and being pressed against the bottom wall of the seal groove by the piston, the improvement which comprises, said seal ring being one-piece, said bottom wall of said groove being V-shaped with legs of substantially equal length, said outer surface of said seal ring also being V-shaped, even when unstressed, with legs of a length less than the length of the corresponding legs of the V-shaped groove, the apex of said V-shaped outer surface of said seal ring being disposed on the apex of said V-shaped bottom wall of said groove, said V-shaped outer surface of said seal ring being engageable with said V-shaped bottom wall of said groove upon elastic deformation of said seal ring and said front wall of said seal groove being spaced throughout its extent from said front surface of said seal ring.

2. The sealing device as defined in claim 1, including a bevelled wall extending between said front wall of said seal groove and said inner surface of said cylinder.

3. In a sealing device for an automobile disk brake having a cylinder and a piston slidably inserted in the cylinder, said sealing device comprising an annular seal groove provided in the inner surface of said cylinder and having a substantially rectangular cross section defined by a rear wall, a bottom wall and a front wall extending from the front end of said bottom wall forwardly and inwardly with respect to the inner surface of said cylinder, and an elastically deformable seal ring having a substantially rectangular cross section defined by a front surface, a rear surface, an inner surface and an outer surface, the seal ring having a radial thickness larger than the depth of the seal groove and being pressed against the bottom wall of the seal groove by the piston, the improvement which comprises said seal ring being one-piece, said bottom and front walls of said groove being of substantially equal length and forming a V-shaped portion, said outer surface of said seal ring being V-shaped, even when unstressed, with legs having a length less than that of the respective bottom and front walls of the V-shaped portion with which they abut, the apex of said V-shaped outer surface of said seal ring being disposed on said V-shaped portion of said seal ring, said V-shaped outer surface of said seal ring being engageable with said front and bottom walls of said groove upon elastic deformation of said seal ring and said front wall of said seal groove being spaced from said front surface of said seal ring.

4. In a sealing device for an automobile disk brake having a cylinder and a piston in the cylinder, said sealing device comprising an annular seal groove defined in the inner surface of said cylinder and having a front wall, a rear wall, and a bottom wall, and an elastically deformable one-piece seal ring in said groove, said seal ring having a front surface, a rear surface, a radially inner surface and a radially outer surface, having a radial thickness greater than the depth of the groove and being pressed against the bottom wall of the groove by the piston, the improvement comprising:

said bottom wall of said groove being V-shaped in transverse cross-section with the legs of the V being of substantially equal length and with the apex of the V being radially outermost;

said front wall of said groove being straight and substantially radially extending;

said rear wall of said groove being straight and substantially radially extending;

said radially outer surface of said seal ring being V-shaped with the legs of the V being of substantially equal length which is slightly less than the length of the legs of the V-shaped bottom wall of the groove, the apex of the V-shaped outer surface of the seal ring being in abutment with the apex of the V-shaped bottom wall of the groove upon elastic deformation of the seal ring and, in the absence of fluid pressure on said seal ring, said front wall of said groove is spaced throughout its extent a short substantially uniform distance from said front surface of said seal ring and said rear wall of said groove is spaced throughout its extent a short substantially uniform distance from said rear surface of said seal ring.

5. In a sealing device for an automobile disk brake having a cylinder and a piston in the cylinder, said sealing device comprising an annular seal groove defined in the inner surface of said cylinder and having a front wall, a rear wall, and a bottom wall, and an elastically deformable one-piece seal ring in said groove, said seal ring having a front surface, a rear surface, a radially inner surface, and a radially outer surface, having a radial thickness greater than the depth of the groove and being pressed against the bottom wall of the groove by the piston, the improvement comprising:

said bottom wall of said groove being V-shaped in transverse cross-section with the legs of the V being of substantially equal length and with the apex of the V being radially outermost;

said front wall of said groove having a first straight part extending substantially radially inwardly from the bottom wall of the groove and a second straight bevelled part of a length less than that of the first part, said second part extending at an angle from the first part and terminating at the inner surface of the cylinder;

said rear wall of said groove being straight and substantially radially extending;

said radially outer surface of said seal ring being V-shaped with the legs of the V being of substantially equal length which is slightly less than the length of the legs of the V-shaped bottom wall of the groove;

the apex of the V-shaped outer surface of the seal ring being in abutment with the apex of the V-shaped bottom wall of the groove upon elastic deformation of the seal ring and, in the absence of fluid pressure on said seal ring, said first part of said front wall of said groove is spaced throughout its extent a short substantially uniform distance from said front surface of said seal ring and said rear wall of said groove is spaced throughout its extent a short substantially uniform distance from said rear surface of said seal ring.

6. In a sealing device for an automobile disk brake having a cylinder and a piston in the cylinder, said sealing device comprising an annular seal groove defined in the inner surface of said cylinder and having a front wall, a rear wall, and a bottom wall, and an elastically deformable one-piece seal ring in said groove, said seal ring having a front surface, a rear surface, a radially inner surface, and a radially outer surface, having a radial thickness greater than the depth of the groove and being pressed against the bottom wall of the groove by the piston, the improvement comprising:

said rear wall of said groove being straight and substantially radially extending;

said bottom wall of said groove being straight and extending to said front wall from said rear wall at an angle of greater than 90° relative thereto;

said front wall being of substantially the same length as said bottom wall, being straight, and extending radially inwardly to the inner surface of said cylinder from said bottom at an angle of greater than 90° relative thereto;

said bottom and front wall defining a V-shaped portion between them with the apex of the V being radially outermost;

said radially outer surface of said seal ring being V-shaped with the legs of the V being of substantially equal length which is slightly less than that of the bottom wall;

the apex of the V-shaped outer surface of the seal ring being in abutment with the apex of said V-shaped portion and the V-shaped outer surface of the seal ring being in abutment with the front and bottom walls of the groove upon elastic deformation of the seal ring and, in the absence of fluid pressure on said seal ring, said front and rear surfaces of the seal ring being substantially straight and radially extending, said rear wall of said groove is spaced throughout its extent a short substantially uniform distance from the rear surface of the seal ring and said front surface of said seal ring and the radially inner end of said front wall of said groove diverge from each other radially inwardly.

* * * * *